(12) United States Patent
Dai et al.

(10) Patent No.: US 7,603,484 B2
(45) Date of Patent: Oct. 13, 2009

(54) PROTOCOL FOR COMMUNICATION WITH A USER-MODE DEVICE DRIVER

(75) Inventors: Chung Lang Dai, Redmond, WA (US); Mukund Sankaranarayan, Sammamish, WA (US); Stuart R. Patrick, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 11/111,413

(22) Filed: Apr. 21, 2005

(65) Prior Publication Data

US 2006/0253859 A1 Nov. 9, 2006

(51) Int. Cl.
G06F 3/00 (2006.01)
G06F 9/44 (2006.01)
G06F 9/46 (2006.01)
G06F 13/00 (2006.01)

(52) U.S. Cl. .......................................... 710/5; 719/327
(58) Field of Classification Search .................. 719/327
See application file for complete search history.

(56) References Cited

U.S. PATENT DOCUMENTS

2002/0152331 A1* 10/2002 Wong et al. ................. 709/321
2005/0015702 A1* 1/2005 Shier et al. .................. 714/776
2005/0050236 A1 3/2005 Zeryck et al.
2005/0257226 A1* 11/2005 Belvin et al. ................ 719/328

OTHER PUBLICATIONS

U.S. Appl. No. 10/985,360, filed Nov. 10, 2004, Wieland et al.
U.S. Appl. No. 11/111,016, filed Apr. 21, 2005, Sankaranarayan et al.
Galen C. Hunt, Creating User-Mode Device Drivers with a Proxy, Proceedings of the 1st USENIX Windows NT Workshop, Aug. 1999, pp. 1-6, Seattle, WA.

* cited by examiner

Primary Examiner—Henry W. H. Tsai
Assistant Examiner—Kris Rhu
(74) Attorney, Agent, or Firm—Wolf, Greenfield & Sacks, P.C.

(57) ABSTRACT

A user-mode device driver architecture is provided by the subject invention. The architecture includes a reflector, a driver manager and a host process which hosts and isolates one or more user-mode device driver(s). The user-mode device driver runs in the user-mode (UM) environment and has access to various UM services. The reflector resides in "kernel memory" (e.g., memory/resource(s) available to operating system) while the driver manager, host process and user mode device driver(s) are located in user space (e.g., memory/resource(s) available to user application(s)). The reflector provides a secure, stable communication path for application(s), the host process and/or user-mode device driver(s) to communicate with the operating system.

18 Claims, 7 Drawing Sheets

PROTOCOL FOR COMMUNICATION WITH A USER-MODE DEVICE DRIVER

CROSS-REFERENCE TO RELATED APPLICATIONS

This application is related to co-pending U.S. utility application Ser. No. 11/111,016 filed on Apr. 21, 2005, entitled ISOLATION OF USER-MODE DEVICE DRIVERS, the entirety of which is incorporated herein by reference.

TECHNICAL FIELD

The subject invention relates generally to user-mode device driver(s), and, more particularly to a protocol for communication with user-mode device driver(s).

BACKGROUND OF THE INVENTION

A device driver (e.g., driver) is a software component (e.g., program) that permits a computer system to communicate with a particular device. Because the driver handles device specific features, an operating system is freed from the burden of having to understand and support needs of individual hardware devices. However, if a driver is problematic, the particular device controlled by the driver can fail to work properly and can even be completely inoperative. Additionally, a problematic driver can often cause an operating system to become unstable, create problems with a whole computer system and may even lead to system operation halting.

Computer systems today often employ a significant number of devices and corresponding device drivers. For example, a typical computer system can utilize devices such as sound cards, bus controllers, video capture devices, audio capture devices, universal serial bus devices, firewire controllers and devices, DVD drives, network cards, DSL modems, cable modems, LCD monitors, monitors, laser printers, ink jet printers, fax machines, scanners, digital cameras, digital video cameras and the like. Additionally, a single device can employ more than one device driver. For example, a typical 3-D video card can require numerous device drivers.

Most drivers are provided by third parties. A driver is added to the system, for example, whenever a user adds a new piece of hardware to their machine. Additionally drivers are frequently updated to fix problems/bugs in the driver, add performance and/or add other features. Most drivers run in the kernel of the operating system; which means if they do anything wrong it can be fatal to the running of the entire computer.

SUMMARY OF THE INVENTION

The following presents a simplified summary of the subject invention in order to provide a basic understanding of some aspects of the subject invention. This summary is not an extensive overview of the subject invention. It is not intended to identify key/critical elements of the subject invention or to delineate the scope of the subject invention. Its sole purpose is to present some concepts of the subject invention in a simplified form as a prelude to the more detailed description that is presented later.

A user-mode device driver architecture is provided by the subject invention. The architecture includes a reflector, a driver manager and a host process which hosts and isolates one or more user-mode device driver(s). A user-mode device driver is a component that abstracts hardware functionality. The user-mode device driver runs in the user-mode (UM) environment and has access to various UM services.

With the user-mode device driver(s) located in user-mode environment, as opposed to conventional device driver(s) which are executed in privileged kernel context (or "kernel mode"), instability problem(s) frequently experienced with conventional device driver(s) can be reduced. For example, conventional device drivers are easily capable of causing a fatal system error or crash, either through errors in programming, unplanned and/or unauthorized memory access, unexpected action from the device, and/or even malicious intent of the writer of the device driver. By moving the bulk of the programming for device control into the user context with the computer's application(s), the user-mode device driver generally does not cause system problems, because the user-mode device driver does not have access to the more-sensitive kernel context.

In accordance with an aspect of the subject invention, the reflector resides in "kernel memory" (e.g., memory/resource(s) available to operating system) while the driver manager, host process and user mode device driver(s) are located in user space (e.g., memory/resource(s) available to user application(s)). User-mode device driver(s) can be loaded, for example, when device(s) arrive and user-mode device driver(s) can be started and/or stopped with full plug-and-play (PnP) functionalities. In one example, the user-mode device driver(s) can be employed in a layered device driver model.

The reflector provides a secure, stable communication path for application(s), the host process and/or user-mode device driver(s) to communicate with the operating system. The reflector can provide security, to prevent interjection of malicious and/or unauthorized requests by rogue programs. The reflector can further provide robustness, so error(s) in programming of the user-mode device driver(s) do not accidentally destabilize the operating system (e.g., kernel). Further, the reflector can provide reliability, to ensure that messages sent to and/or from the reflector arrive. Additionally, the reflector can provide multiple communication channels, to allow multiple user-mode device drivers to communicate with a single reflector.

The reflector can redirect input/output (I/O) request(s) from application(s) to the user-mode device driver(s). Additionally, the reflector can perform security and/or parameter checking on I/O requests. The reflector can be at the top of a kernel device stack, thus allowing the reflector to intercept application I/O request(s) and forward them to the host process. Further, the reflector can forward plug-and-play message(s) from the operating system to the host process. This allows the user-mode device driver(s) to participate in the standard installation, loading and unloading of drivers afforded to convention kernel driver(s).

Yet another aspect of the subject invention provides for the driver manager to serve as the reflector's "extension" into the user space. The driver manager can create the host process in response to a request from the reflector (e.g., when a plug-and-play subsystem initializes a device). The driver manager can run as a service of a computer system's operating system. Additionally, the driver manager can track information on host process(es). Finally, the driver manager can destroy the host process (e.g., in response to a request from the reflector).

Another aspect of the subject invention provides for the user-mode device driver(s) to be loaded by the host process which manages communication with the reflector (e.g., via secure channel(s)). The host process thus provides the runtime environment for the user-mode device driver(s). In one example, four channels can be employed—two channels for input and output, one channel for signaling device arrival/removal ("plug and play event(s)"), and, one channel for out-of band cancellation of message(s) already sent. In another example, more channels are used for each of these types of communication. In yet another example, one channel is employed.

The reflector and the host process communicate via IPC message(s) which can map, for example, to a system event (e.g., add device and/or PnP start device) that the reflector receives. IPC message(s) sent to the host process can be asynchronous, for example, with a device specific timeout value.

To the accomplishment of the foregoing and related ends, certain illustrative aspects of the subject invention are described herein in connection with the following description and the annexed drawings. These aspects are indicative, however, of but a few of the various ways in which the principles of the subject invention may be employed and the subject invention is intended to include all such aspects and their equivalents. Other advantages and novel features of the subject invention may become apparent from the following detailed description of the subject invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

Figure 1:
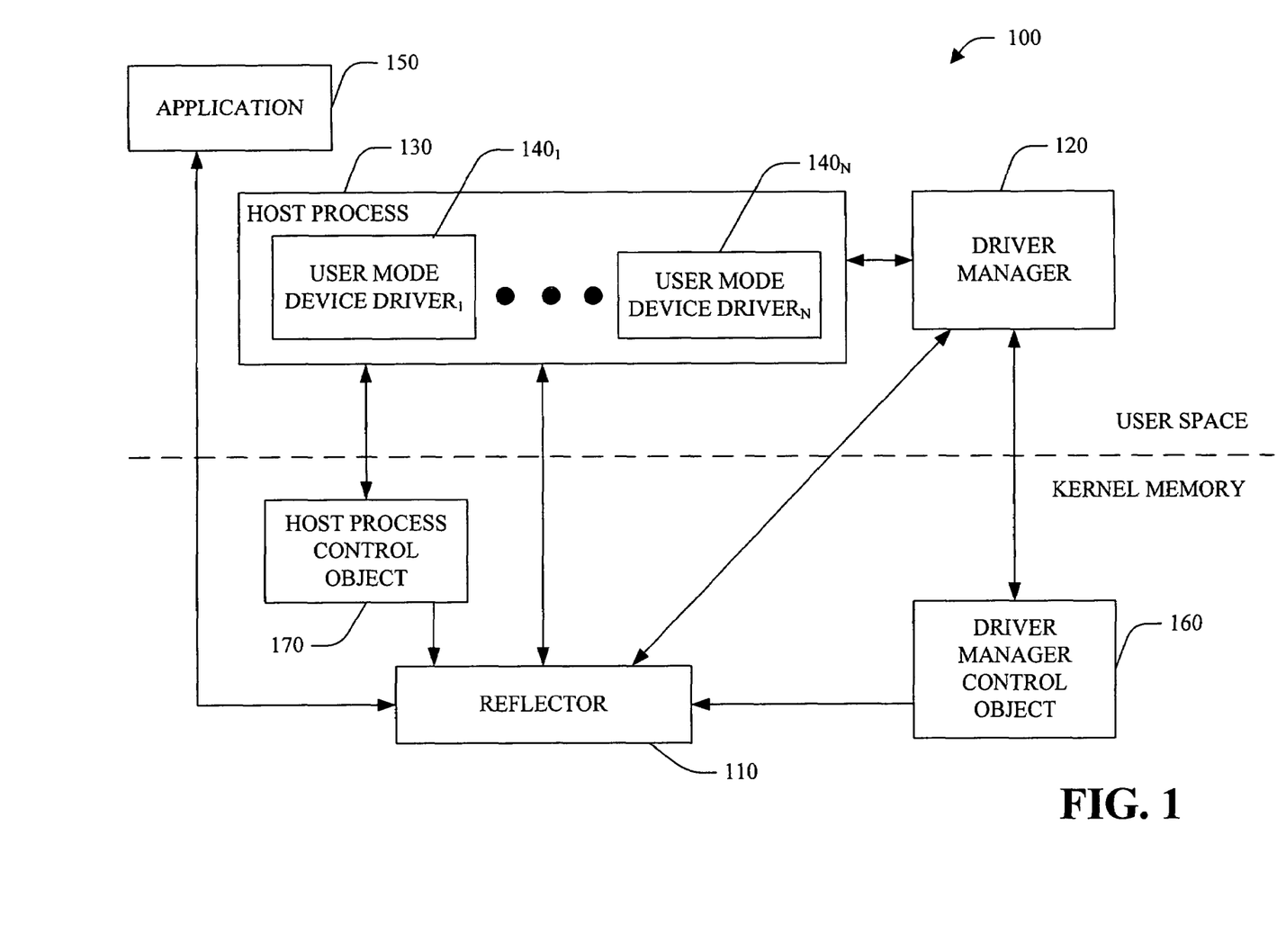
FIG. 1 is a block diagram of a user-mode device driver architecture in accordance with an aspect of the subject invention.

Referring to FIG. 1, a user-mode device driver architecture 100 in accordance with an aspect of the subject invention is illustrated. The architecture 100 includes a reflector 110, an optional driver manager 120 and a host process 130 which hosts and isolates one or more user-mode device driver(s) 140.

A user-mode device driver 140 is a component that abstracts hardware functionality. The user-mode device driver 140 runs in the user-mode (UM) environment and has access to various UM services.

The reflector 110 resides in "kernel memory" (e.g., memory/resource(s) available to operating system) while the driver manager 120, host process 130 and user mode device driver(s) 140 are located in user space (e.g., memory/resource(s) available to user application(s)). User-mode device driver(s) 140 can be loaded, for example, when device(s) arrive and user-mode device driver(s) 140 can be started and/or stopped with full plug-and-play (PnP) functionalities. In one example, the user-mode device driver(s) 140 can be employed in a layered device driver model.

Conventionally, device drivers are executed in privileged kernel context (or "kernel mode") on a computer. As a result computer code which is responsible for controlling devices shares memory with the kernel of the operating system. Therefore, conventional device drivers are easily capable of causing a fatal system error or crash, either through errors in programming, unplanned and/or unauthorized memory access, unexpected action from the device, and/or even malicious intent of the writer of the device driver. By moving the bulk of the programming for device control into the user context ("user mode") with the computer's application(s) 150, the user-mode device driver 140 generally does not cause system problems, because the user-mode device driver 140 does not have access to the more-sensitive kernel context.

The reflector 110 provides a secure, stable communication path for application(s) 150, the host process 130 and/or user-mode device driver(s) 140 to communicate with the operating system. In accordance with aspects of the subject invention, the reflector 110 can provide:

Security, to prevent interjection of malicious and/or unauthorized requests by rogue programs;

Robustness, so error(s) in programming of the user-mode device driver(s) 140 do not accidentally destabilize the operating system (e.g., kernel);

Reliability, to ensure that messages sent to and/or from the reflector 110 arrive;

Order, so that messages sent by application(s) 150, the host process 130 and/or user-mode device driver(s) 140 are received by the reflector 110 in the same order in which they were sent; and/or Multiple communication channels, to allow multiple user-mode device drivers 140 to communicate with a single reflector 110.

Reflector 110

In one example, the reflector 110 is a kernel mode driver that can redirect input/output (I/O) request(s) from application(s) 150 to the user-mode device driver(s) 140. Additionally, the reflector 110 can perform security and/or parameter checking on I/O requests. The reflector 110 can be at the top of a kernel device stack (not shown), thus allowing the reflector 110 to intercept application I/O request(s) and forward them to the host process 130. Further, the reflector 110 can forward plug-and-play message(s) from the operating system (not shown) to the host process 130. This allows the user-mode device driver(s) 140 to participate in the standard installation, loading and unloading of drivers afforded to convention kernel driver(s).

For example, depending on the device class, an I/O request forwarded to the user-mode device driver(s) 140 can be resubmitted back to the reflector 110. In this case, the reflector 110 forwards the I/O request to a lower device stack for further processing. On completion, an I/O completion code can be returned back to the user-mode device driver(s) 140 which will return the I/O request back to the reflector 110. Thereafter, the reflector 110 can return the I/O completion code back to the requesting application 150.

Figure 2:
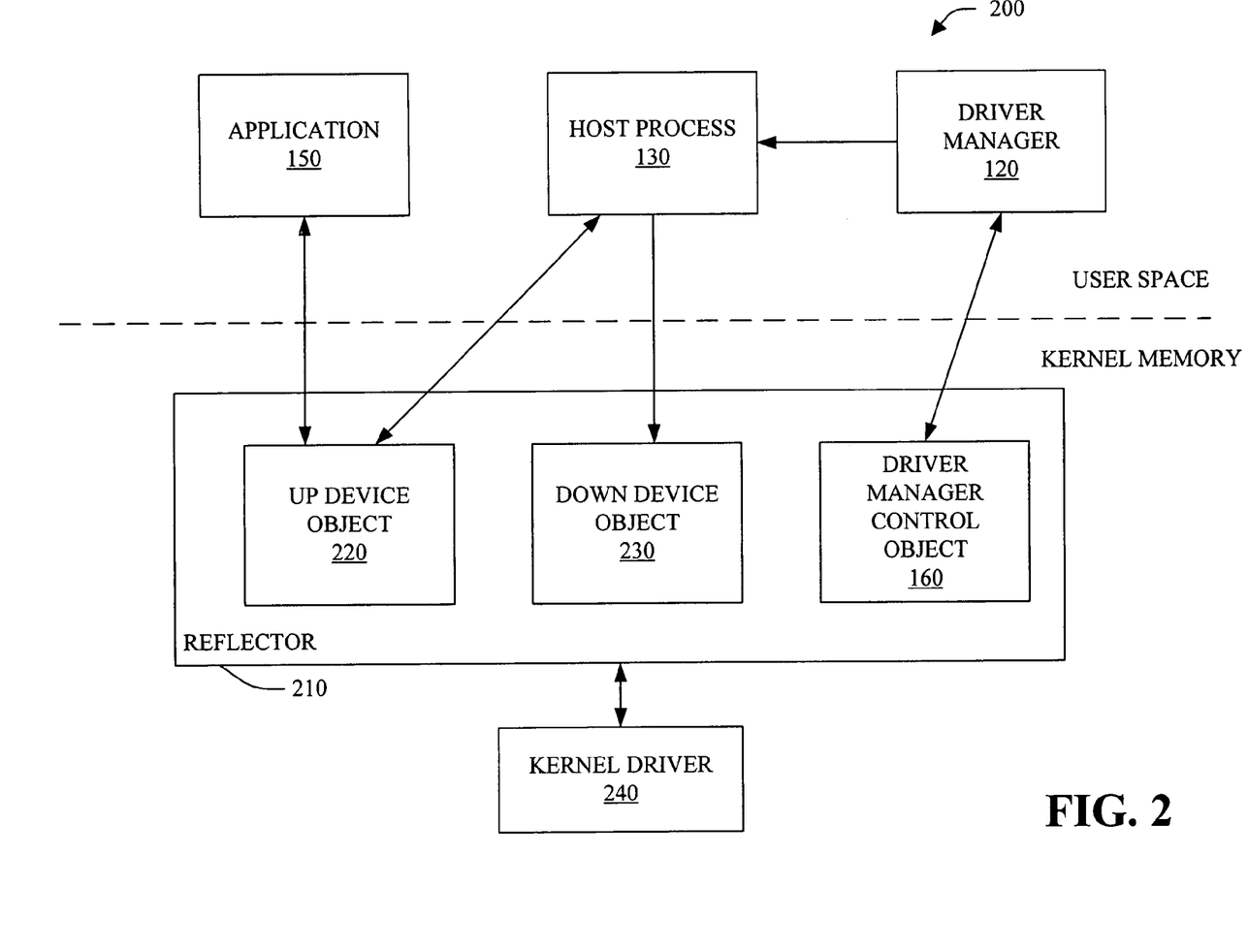
FIG. 2 is a block diagram of a user-mode device driver architecture in accordance with an aspect of the subject invention.

Referring briefly to FIG. 2, a user-mode device driver architecture 200 in accordance with an aspect of the subject invention is illustrated. In this example, a reflector 210 includes an up device object 220, a down device object 230 and the driver manager control object 160. As illustrated in FIG. 2, the reflector 200 is central to the architecture 200 as the other components including the application 150, host process 130 and the driver manager 120 communicate with the reflector 200.

In this example, the reflector 210 is a kernel filter driver and is at the top of kernel device stack. This allows the reflector 210 to intercept application I/O requests and forward them to the host process 130. In addition to the application requests, the reflector 210 also forwards PnP message(s) received from the operating system to the host process 130. This allows the user-mode device driver(s) 140 to participate in the standard installation, loading and unloading of drivers afforded to kernel drivers.

It is often necessary for the user-mode device driver(s) 140 to communicate with kernel driver(s) 240 below the reflector 210, for example, in response to an application 150 I/O request forwarded from the reflector 210. Since this communication happens via the reflector 210, the reflector 210 needs to distinguish application 150 I/O requests from user-mode device driver 140 I/O requests to the kernel driver 240.

In this example, the reflector 210 accomplishes this by creating two device objects for each device stack (also referred to herein as "DevNode")—one device object for application(s) 150 to send request(s) to the user-mode device driver(s) 140, which is referred to as the up device object 220. The down device object 230 enables the user-mode device driver(s) 140 to send request(s) to the kernel driver(s) 240 below the reflector 210.

Driver Manager 120

Referring back to FIG. 1, the driver manager 120 is the reflector 110's "extension" into the user space. The driver manager 120 can create the host process 130 in response to a request from the reflector 110 (e.g., when a plug-and-play subsystem initializes a device). The driver manager 120 can run as a service of a computer system's operating system. Additionally, the driver manager 120 can track information on host process(es) 130. Finally, the driver manager 120 can destroy the host process 130 (e.g., in response to a request from the reflector 110).

For example, when the reflector 110 is loaded, its standard driver entry function can be called. During such time, the reflector 110 can communicate with the driver manager 120, for example, using a particular user-mode driver framework (UMDF) advanced local procedure call (ALPC) library. During the connection process, the reflector 110 can provide a security identifier (SID) of the driver manager 120 for authentication. In this example, if the reflector 110 fails to create an IPC connection with the driver manager 120, the reflector 110 fails its driver entry function and unloads from the system (e.g., device not enabled when any one of its drivers fails its driver entry routine).

The communication channel between reflector 110 and the driver manager 120 can be maintained (e.g., through the lifetime of the reflector 110). In one example, if the communication is broken for any reason, the reflector 110 can tear down all device stacks and unloads the host process 130 from the system.

The driver manager 120 can employ a driver manager control object 160 to send request(s) to the reflector 110 in the context of the driver manager 120. As noted previously, in one example, communication between the reflector 110 and the driver manager 120 is generally effected via a UMDF ALPC library. However, the UMDF ALPC library delivers message(s) in the receiver's context (e.g., sender(s)' process specific data becomes invalid).

Access to the driver manager control object 160 can controlled (e.g., via an access control list) with the SID of the driver manager 120. Thus, request(s) must come only from the driver manager 120.

In one example, communication between the reflector 110 and the driver manager 120 is performed via inter process communication (IPC) message(s) (e.g., with a standard timeout value). Exemplary IPC messages include:

Process Management—Control Object Name

The reflector 110 can send this message synchronously along with a name of a driver manager control object 160 to the driver manager 120. Thereafter, the driver manager can open and send request(s) to the reflector 110 via the driver manager control object 160 identified in this message.

Process Management—Open Process

The reflector 110 can send this message asynchronously along with a device physical device object (PDO) name to the driver manager 120 (e.g., to create a new process associated with the given device). For example, the name of the process executable can be stored in a device registry. If the process is already loaded, the driver manager 120 can increment an internal referenced count associated with this host process 130 and make sure the host process 130 is not unloaded until the last internal reference is released.

In this example, a handle to a particular host process 130 can be driver manager 120 specific. The driver manager 120 can pass the handle to the reflector 110 via an I/O control (e.g., IOCTL_RD_SET_PROCESS_ID). When the driver manager 120 creates a host process 130, the driver manager 120 provides an IPC endpoint name to the host process 130 (e.g., as a command line argument). The host process 130 can listen from this IPC endpoint and accept connection from the driver manager 130 and the reflector 110. This endpoint name can be passed to the reflector 110 when the driver manager 120 replies to the open process message.

In one example, before sending this message to the driver manager 120, the reflector 110 can pre-allocate a Process Management—Close Process message (discussed below), in order to ensure that it has sufficient resource to release the open process.

Process Management—Close Process

The reflector 110 can send this message asynchronously along with a device PDO name to the driver manager 120 to release the reference on a host process 130 for the given device. In one example, the reflector 110 can send this message only if it has successfully previously sent a Process Management—Open Process on the same device.

I/O Control

As noted previously, the driver manager 120 can send an I/O control (e.g., IOCTL_RD_SET_PROCESS_ID) in response to a Process Management—Open Process message. Since information requested for the Process Management—Open Process message contains process specific data such as process handle, in one example, the reply must be returned via the driver manager control object 160. In addition to the process handle, the I/O control can include:

PDO name of the device for which the host process 130 is created.

Host process timeout value which is the amount of time the reflector 110 shall wait for each PnP and power request sent to the host process 130.

Name of a local procedure call (LPC) port created by the host process 130 with which the reflector 110 to communicate.

Handle to the host process 130. The reflector 110 can map this handle to a kernel process pointer and take a reference on this pointer in order to make sure the process is not unloaded. When the reflector 110 connects to the host process 130 via the given LPC port name, the reflector 110 can validate that the LPC server process ID matches the process ID given in the host process pointer.

In one example, when the driver manager 120 first starts, the following are performed:

Configuration parameters are loaded from the registry.
Event tracing is enabled, if necessary.
A linked list to track host process(es) is initialized (Process List).
A linked list to track device node(s) is initialized (DevNode List).
A linked list to track service key object(s) is initialized (Service Key List).
A driver manager control object 160 (used to communicate with the reflector 110) is created.
The driver manager 120 beings listening on its ALPC connection for reflector 110 messages.

Thereafter, the driver manager 120 can wait for a message from the reflector 110 to create a host process 130 (e.g., "open process" message). In response to receipt of the host process message, the driver manager 120 can create a new device node (DevNode), for example, using the PDO name in the message. This new device node can be inserted into the DevNode List.

The DevNode can initialize itself with registry information containing a list of drivers to load along with a preferred host process GUID. The driver manager 120 can next create a host process 130, for example, with a Create Process call with a path to the host process 130 executable, host process GUID and/or a port name the host process 130 to assign to the ALPC port it will open when it initializes.

The driver manager 120 then attempts to connect to the host process 130's ALPC port. If this connection times out, or the host process 130 terminates unexpectedly an error is returned. If the connection is successful, the driver manager 120 forwards the host process 130 port name and timeout value to the reflector 110. The reflector 110 connects to the new host process 130 and begins building the driver stack.

In response to a "close process" message from the reflector 110, the driver manager 120 can search the DevNode list for the DevNode matching the PDO name in the Close Process message. Thereafter, the reference(s) on the particular DevNode are released which initiates clean-up of the associated host process list. As part of the destruction process, an "exit process" message is sent to the host process 130. The driver manager 120 can further wait on the handle to the host process 130 and expect it to be signaled when the host process 130 shuts down. However, if after specified time, the host process 130 has not ended, a Terminate Process function can be called to end the host process 130.

Additionally, the driver manager 120 can be shut down upon request (e.g., of the service control manager (SCM)), for example, when the operating system is shutting down. The driver manager 120 can perform the following when it shuts down:

When the SCM sends the SERVICE_CONTROL_STOP control code, the driver manager(s) 120 can call SetEvent on an event it created at start-up time.

When the termination event is signaled, a pre-registered callback routine can execute and call release on the driver manager 120.

The driver manager 120 can shut down and clean-up any DevNode and/or Process objects in their respective lists.

Finally, the ALPC port shared with the reflector 110 can be closed.

Host Process 130

A user-mode device driver 140 is instantiated by the host process 130 which manages communication with the reflector 110, for example, via secure channel(s). The host process 130 thus provides the runtime environment for the user-mode device driver(s) 140. In one example, four channels can be employed—two channels for input and output, one channel for signaling device arrival/removal ("plug and play event(s)"), and, one channel for out-of band cancellation of message(s) already sent. In another example, more channels are used for each of these types of communication. In yet another example, one channel is employed.

In one example, the reflector 110 and the host process 130 communicate via IPC message(s) which can map, for example, to a system event (e.g., add device and/or PnP start device) that the reflector 110 receives. IPC message(s) sent to the host process 130 can be asynchronous, for example, with a device specific timeout value. Exemplary IPC messages between the reflector 110 and the host process 130 can include:

Add Device Message

The reflector 110 can send this message asynchronously to the host process 130, for example, when its AddDevice routine is being called by the operating system's PnP sub-system. Along with the message, the reflector 110 provides the PDO name of the device being added and a name of a host process control object 170. The PDO name can be useful for identifying which device stack the host process 130 is building. For example, the host process 130 can use this PDO name to query the user-mode device driver stack parameters from the device key in the registry in order to build the user-mode device stack.

The host process control object 170 can be created by the reflector 110, for example, for each of the user-mode device driver device(s) 140. The host process control object 170 can be employed by the host process 130 (e.g., driver framework) to forward I/O request(s) to its lower kernel mode device stack. In this example, the host process 130 cannot open itself to forward the I/O request because opening a handle to itself is not allowed until the device stack is started which can be problematic if the driver(s) 140 must open itself prior to start device completion.

When the host process 130 completes the add device message, the host process 130 can return a device stack handle to the reflector 110. In one example, the reflector 110 includes this device stack handle for subsequent message(s) related to the same device stack.

PnP and Power I/O Request Packets

The reflector 110 can forward PnP I/O request packet(s) (IRPs) and/or Power IRPs to the host process 130. Further, the reflector 110 can forward these system IRPs when it travels down and back up the kernel device stack. For example, when the reflector 110 receives an IRP_MN_START_DEVICE IRP from the system, the reflector 110 can forward the start request to the host process 130. When the host process 130 completes the request, the original start IRP can be forwarded to the lower kernel device stack. If the host process 130 completes the request with an optional completion notification, the reflector 110 can forward the start request back to the host process 130 when the lower device stack completes the original IRP.

Exemplary messages based on PnP and/or Power IRPs include:

Start Device Message

The reflector 110 can send this message asynchronously to the host process 130 when it receives an IRP_MN_START_DEVICE from the operating system PnP sub-system. The host process device stack handle can be passed along with this message for identifying the device stack in the host process 130.

Query Remove Device Message

The reflector 110 can sends this message asynchronously to the host process 130 when it receives an IRP_MN_QUERY_REMOVE_DEVICE from the operating system PnP sub-system. The host process device stack handle can be passed along with this message for identifying the device stack in the host process 130.

Remove Device Message

The reflector 110 can send this message asynchronously to the host process 130 when it receives an IRP_MN_REMOVE_DEVICE from the operating system PnP sub-system. The host process device stack handle can be passed along with this message for identifying the device stack in the host process 130.

Cancel Remove Device Message

This message can be sent asynchronously by the reflector 110 to the host process 130 when it receives an IRP_MN_CANCEL_REMOVE_DEVICE from the operating system PnP sub-system. The host process device stack handle can be passed along with this message for identifying the device stack in the host process 130.

Stop Device Message

The reflector 110 can send this message asynchronously to the host process 130 when it receives an IRP_MN_STOP_DEVICE from the operating system PnP sub-system. The host process device stack handle can be passed along with this message for identifying the device stack in the host process 130.

Query Stop Device Message

The reflector 110 can send this message asynchronously to the host process 130 when it receives an IRP_MN_QUERY_STOP_DEVICE from the operating system PnP sub-system. The host process device stack handle can be passed along with this message for identifying the device stack in the host process 130.

Cancel Stop Device Message

This message can be sent asynchronously by the reflector 110 to the host process 130 when it receives an IRP_MN_CANCEL_STOP_DEVICE from the operating system PnP sub-system. The host process device stack handle can be passed along with this message for identifying the device stack in the host process 130.

Query Device Relations Message

The reflector 110 can send this message asynchronously to the host process 130 when it receives an IRP_MN_QUERY_DEVICE_RELATIONS from the operating system PnP sub-system. The host process device stack handle can be passed along with this message for identifying the device stack in the host process 130.

Query Interface Message

This message can be sent asynchronously by the reflector 110 to the host process 130 when it receives an IRP_MN_QUERY_INTERFACE from the operating system PnP sub-system. The host process device stack handle can be passed along with this message for identifying the device stack in the host process 130.

Query Capabilities Message

The reflector 110 can send this message asynchronously to the host process 130 when it receives an IRP_MN_QUERY_CAPABILITIES from the operating system PnP sub-system. The host process device stack handle can be passed along with this message for identifying the device stack in the host process 130.

Query Resources Message

The reflector 110 can send this message asynchronously to the host process 130 when it receives an IRP_MN_QUERY_RESOURCES from the operating system PnP sub-system. The host process device stack handle can be passed along with this message for identifying the device stack in the host process 130.

Query Resource Requirements Message

This message can be sent asynchronously by the reflector 110 to the host process 130 when it receives an IRP_MN_QUERY_RESOURCE_REQUIREMENTS from the operating system PnP sub-system. The host process device stack handle can be passed along with this message for identifying the device stack in the host process 130.

Query Device Text Message

The reflector 110 can send this message asynchronously to the host process 130 when it receives an IRP_MN_QUERY_DEVICE_TEXT from the operating system PnP sub-system. The host process device stack handle can be passed along with this message for identifying the device stack in the host process 130.

Query Filter Resource Requirements Message

The reflector 110 can send this message asynchronously to the host process 130 when it receives an IRP_MN_QUERY_FILTER_RESOURCE_REQUIREMENTS from the operating system PnP sub-system. The host process device stack handle can be passed along with this message for identifying the device stack in the host process 130.

Read Configuration Message

This message can be sent asynchronously by the reflector 110 to host process 130 when it receives an IRP_MN_READ_CONFIG from the operating system PnP sub-system.

The host process device stack handle can be passed along with this message for identifying the device stack in the host process 130.

Write Configuration Message

The reflector 110 can send this message asynchronously to the host process 130 when it receives an IRP_MN_WRITE_CONFIG from the operating system PnP sub-system. The host process device stack handle can be passed along with this message for identifying the device stack in the host process 130.

Eject Message

The reflector 110 can send this message asynchronously to the host process 130 when it receives a IRP_MN_EJECT from the operating system PnP sub-system. The host process device stack handle can be passed along with this message for identifying the device stack in the host process 130.

Set Lock Message

The reflector 110 can send this message asynchronously to the host process 130 when it receives an IRP_MN_SET_LOCK from the operating system PnP sub-system. The host process device stack handle can be passed along with this message for identifying the device stack in the host process 130.

Query ID Message

The reflector 110 can send this message asynchronously to the host process 130 when it receives an IRP_MN_QUERY_ID from the operating system PnP sub-system. The host process device stack handle can be passed along with this message for identifying the device stack in the host process 130.

Query PnP Device State Message

This message can be sent asynchronously by the reflector 110 to the host process 130 when it receives an IRP_MN_QUERY_PNP_DEVICE_STATE from the operating system PnP sub-system. The host process device stack handle can be passed along with this message for identifying the device stack in the host process 130.

Query Bus Information Message

The reflector 110 can send this message asynchronously to the host process 130 when it receives an IRP_MN_QUERY_BUS_INFORMATION from the operating system PnP sub-system. The host process device stack handle can be passed along with this message for identifying the device stack in the host process 130.

Device Usage Notification Message

The reflector 110 can send this message asynchronously to the host process 130 when it receives an IRP_MN_DEVICE_USAGE_NOTIFICATION from the operating system PnP sub-system. The host process device stack handle can be passed along with this message for identifying the device stack in the host process 130.

Surprise Removal Message

The reflector 110 can send this message asynchronously to the host process 130 when it receives an IRP_MN_SURPRISE_REMOVAL from the operating system PnP sub-system. The host process device stack handle can be passed along with this message for identifying the device stack in the host process 130.

Query Proximity Domain Message

The reflector 110 can send this message asynchronously to the host process 130 when it receives an IRP_MN_QUERY_PROXIMITY_DOMAIN from the operating system PnP sub-system. The host process device stack handle can be passed along with this message for identifying the device stack in the host process 130.

Wait Wake Message

This message can be sent asynchronously by the reflector 110 to the host process 130 when it receives an IRP_MN_WAIT_WAKE from the operating system PnP sub-system. The host process device stack handle can be passed along with this message for identifying the device stack in the host process 130.

Power Sequence Message

The reflector 110 can send this message asynchronously to the host process 130 when it receives an IRP_MN_POWER_SEQUENCE from the operating system PnP sub-system. The host process device stack handle can be passed along with this message for identifying the device stack in the host process 130.

Set Power Message

The reflector 110 can send this message asynchronously to the host process 130 when it receives an IRP_MN_SET_POWER from the operating system PnP sub-system. The host process device stack handle can be passed along with this message for identifying the device stack in the host process 130.

Query Power Message

The reflector 110 can send this message asynchronously to the host process 130 when it receives an IRP_MN_QUERY_POWER from the operating system PnP sub-system. The host process device stack handle can be passed along with this message for identifying the device stack in the host process 130.

File I/O Request(s)

The reflector 110 can provide file I/O requests to the host process 130. Exemplary messages include:

Create Message

The reflector 110 can send this message asynchronously to the host process 130 when it receives an IRP_MJ_CREATE from the operating system I/O sub-system. A host process device stack handle can be passed along with this message for identifying the device stack in the host process 130. When the host process 130 replies to this message, it returns a unique host process file handle associated with this create operation.

Additionally, in one example, the host process 130 can also return two IPC endpoint names. One of these two names is to create an IPC connection for passing I/O messages and the other name is to create a separate IPC connection for passing I/O cancellation message(s). In this example, the reflector 110 maintains these two connections (e.g., until the returned file handle is closed).

Cleanup Message

The reflector 110 can send this message asynchronously to the host process 130 when it receives an IRP_MJ_CLEANUP from the operating system I/O sub-system. A host process file handle can be passed along with this message. Furthermore, the message can have a timeout limit (e.g., pre-determined by a system policy). In one example, when the host process 130 receives this message, it cancels all I/O request(s) associated with the given host process file handle.

Close Message

The reflector 110 can send this message asynchronously to the host process 130 when it receives an IRP_MJ_CLOSE from the operating system I/O sub-system. A host process file handle can be passed along with this message. When the reflector 110 receives a reply to the close message, it can also close the IPC connections created during Create Message (discussed above).

Read Message

The reflector 110 can send this message asynchronously to the host process 130 when it receives an IRP_MJ_READ from the operating system I/O sub-system. A host process file handle can be passed along with this message.

Write Message

The reflector 110 can send this message asynchronously to the host process 130 when it receives an IRP_MJ_WRITE from the operating system I/O sub-system. A host process file handle can be passed along with this message.

IO Control Message

The reflector 110 can send this message asynchronously to the host process 130 when it receives an IRP_MJ_DEVICE_CONTROL from the operating system I/O sub-system. A host process file handle can be passed along with this message.

It is to be appreciated that the architecture 100, the reflector 110, the driver manager 120, the host process 130, the user-mode device driver(s) 140, the application 150, the driver manager control object 160, the host process control object 170, the architecture 200, the reflector 210, the up device object 220, the down device object 230 and/or the kernel driver 240 can be computer components as that term is defined herein.

Figure 3:
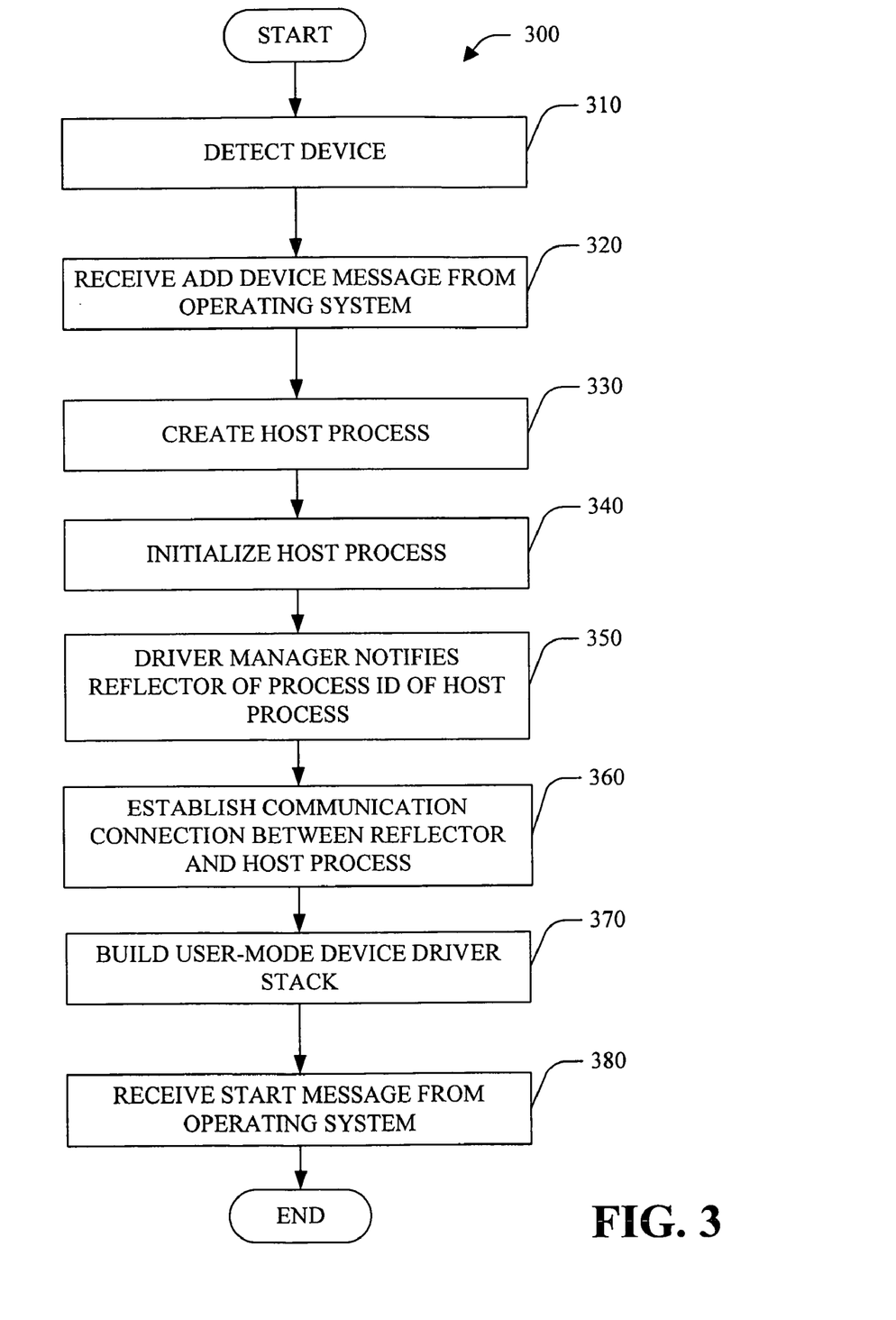
FIG. 3 is a flow chart of a method of initializing a user-mode device driver architecture in accordance with an aspect of the subject invention.
Figure 4:
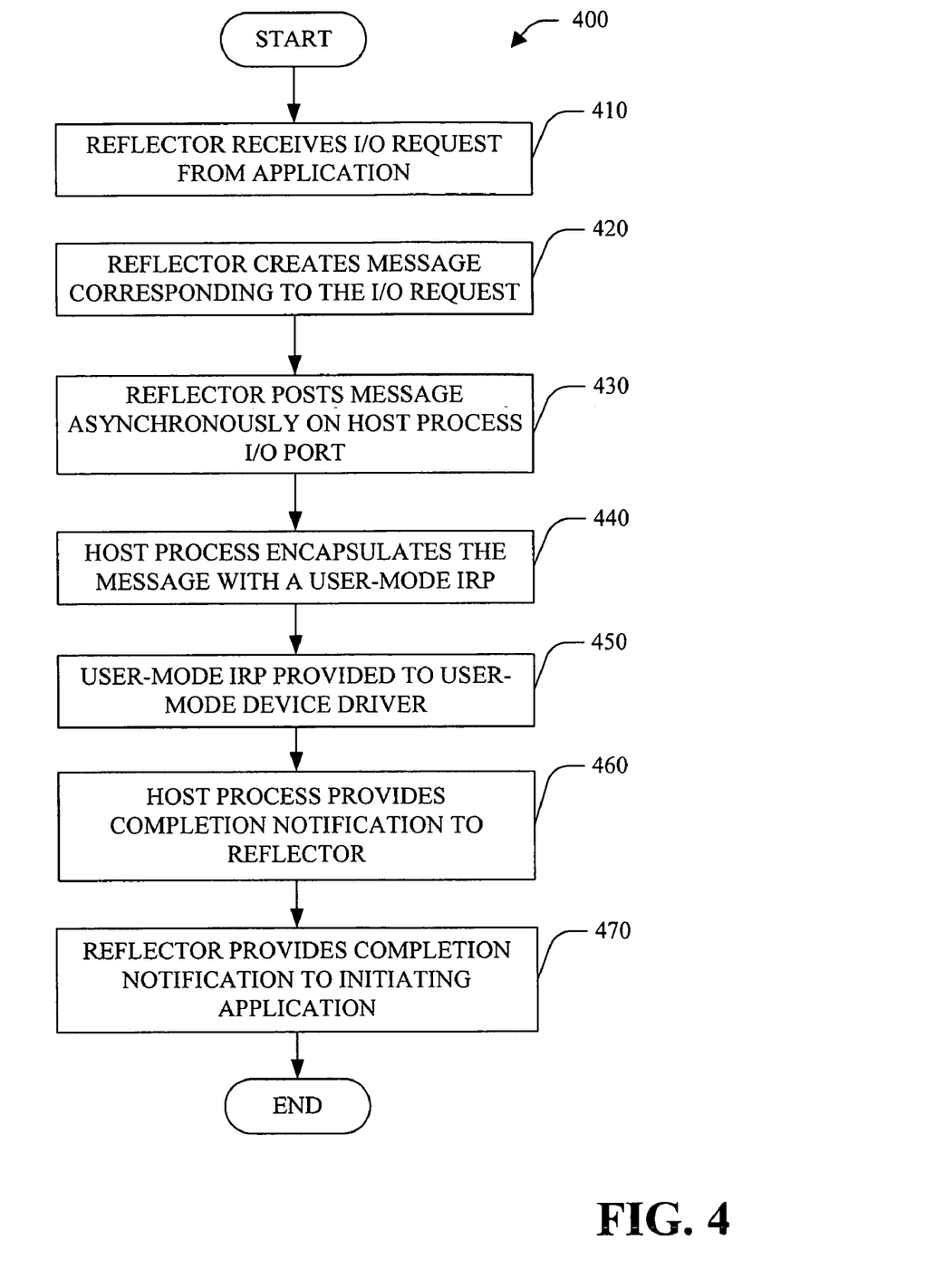
FIG. 4 is a flow chart of a method of dispatching I/O in a user-mode device driver architecture in accordance with an aspect of the subject invention.
Figure 5:
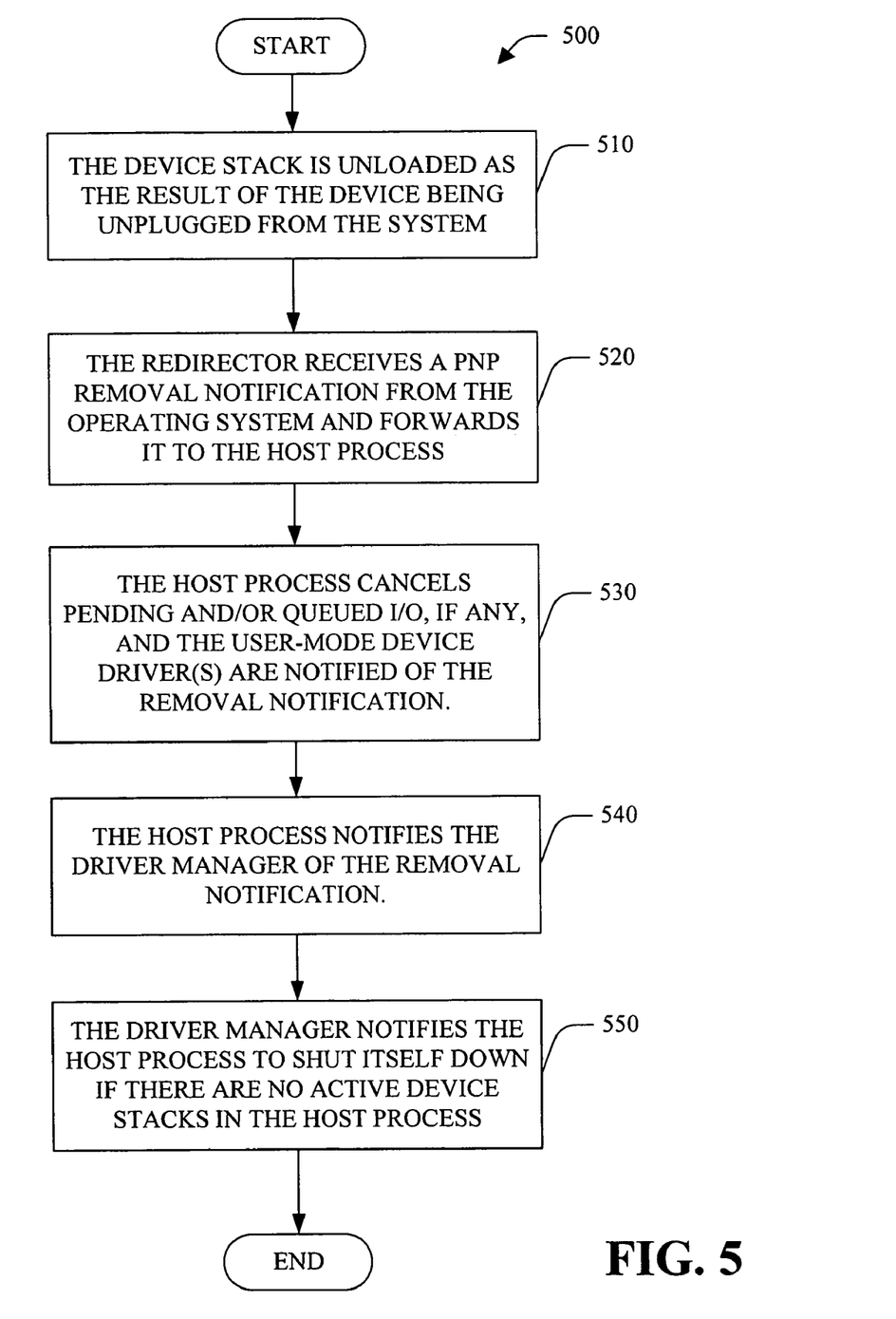
FIG. 5 is a flow chart of a method of tearing down a user-mode device driver runtime environment in accordance with an aspect of the subject invention.

Turning briefly to FIGS. 3-5, methodologies that may be implemented in accordance with the subject invention are illustrated. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The subject invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Use of the user-mode device driver architecture 100, 200 can be described in three phases: (a) initialization phase—at the end of which the runtime environment is ready to receive I/O request(s) from application(s); (b) the steady state phase during which application(s) can issue I/O requests; and, (c) teardown phase during which the runtime environment is shutdown.

Referring to FIG. 3, a method of initializing a user-mode device driver architecture 300 in accordance with an aspect of the subject invention is illustrated. At 310, a device is detected, for example, by the operating system. In one example, the default state of the driver manager 120 service in the operating system is stopped and manually started. When a user-mode device driver 140 is installed the co-installer for that device is responsible for starting the driver manager 120 service. In this example, once started, this service is not stopped. A reason to start the service on-demand is to minimize the security attacks on the system. For example, the service can revert to the stop state when last user-mode device driver 140 in the system is uninstalled. The driver manager 120, as part of the initialization, can create a well known ALPC server port for the reflector 110, 210 to connect. The ALPC server port can be secured through an access control list such that only component(s) running in the system account, like the reflector 110, 210, can connect to it. Additionally, the operating system can load a kernel driver, and, the reflector can establish connection with the well-known server port previously created by the driver manager.

Next, at 320, an add device message is received from the operating system, for example, by the reflector 110, 210. Thereafter, at 330, the host process is created by the driver manager 120, for example, in response to a request from the reflector 110, 210.

At 340, the host process is initialized. For example, the host process 130, during its initialization, can create the three ALPC server ports discussed previously. Additionally, the host process 130 can also create an ALPC port for communication with the driver manager 120. At 350, the driver manager notifies the reflector of the process ID of the newly created host process.

Next, at 360, the reflector establishes a communication connection to the host process, for example, via the server ports created by the host process. At 370, the host process build a user-mode device driver stack, for example, in response to an Add Device PnP message received from the reflector. For example, the driver stack can be built as follows:

The host process (e.g., via a user-mode I/O manager) can obtain a list of user-mode device driver(s) from the registry. The host process then can load device driver(s). The host process can then create a "device stack" object which is the user mode representation of dev-node. It keeps track of the drivers loaded and the ordering between them.

The host process (e.g., via a user-mode I/O manager) can then load the appropriate User Mode Driver Framework library for each of the loaded user-mode device driver(s). The library can be initialized with the corresponding user-mode device driver(s).

The library initializes its internal states and invokes the user-mode device driver's entry point (e.g., IDriverEntry::OnInitialize and IDriverEntry::AddDevice).

The host process returns the newly created device stack object as a context to the reflector. This allows the process manager to distinguish between the multiple device stack objects on subsequent calls from the reflector.

At 380, a start message is received from the operating system by the reflector (e.g., PnP Start Message). The reflector notifies the host process which in turn notifies the user-mode device driver.

Turning to FIG. 4, a method of dispatching I/O in a user-mode device driver architecture 400 in accordance with an aspect of the subject invention is illustrated. In one example, application(s) use standard operating system file I/O APIs (e.g., CreateFile, ReadFile, DeviceIoControl etc.) to interact with user-mode device driver(s). In this example, these calls go through the standard security and parameter checking in the operating system and then get routed to the reflector for further processing as described below.

At 410, the reflector receives an I/O request from an application. At 420, the reflector creates a message (e.g., ALPC message) corresponding to the I/O request. Next, at 430, the reflector posts the message asynchronously on a host-process I/O port. The reflector can further complete the original I/O request with STATUS_PENDING result, which returns the thread control to the caller.

At 440, the host process receives the message from the reflector and encapsulates the message with a user-mode IRP (as discussed previously). At 450, the user-mode IRP is provided to the user-mode device driver. For example, the encapsulated message can be forwarded to a library which can provide it to a user-mode device driver's I/O queue where it can be held until the driver becomes ready to accept the request. In one example, the actual presentation of the request to the user-mode device driver depends on a locking mechanism chosen by the user-mode device driver and an amount of concurrency it is willing to handle. In the case where the user-mode device driver has no locking specified and accepts any number of requests, the request can be immediately delivered to the user-mode device driver.

When a request is delivered to the user-mode device driver, it is eventually completed. At 450, the action of completing the request results in the host process providing completion notification to the reflector. At 460, the reflector provides completion notification to the initiating application.

Referring next to FIG. 5, a method of tearing down a user-mode device driver runtime environment 500 in accordance with an aspect of the subject invention is illustrated. Generally, the host process can be shut down when the last the device stack in it is unloaded.

At 510, the device stack is unloaded as the result of the device being unplugged from the system. At 520, the reflector a PnP removal notification from the operating system and forwards it to the host process. At 530, the host process cancels pending and/or queued I/O, if any, and the user-mode device driver(s) are notified of the removal notification. At 540, the host process notifies the driver manager of the removal notification. At 550, the driver manager notifies the host process to shut itself down if there are no active device stack(s) in the host process.

Figure 6:
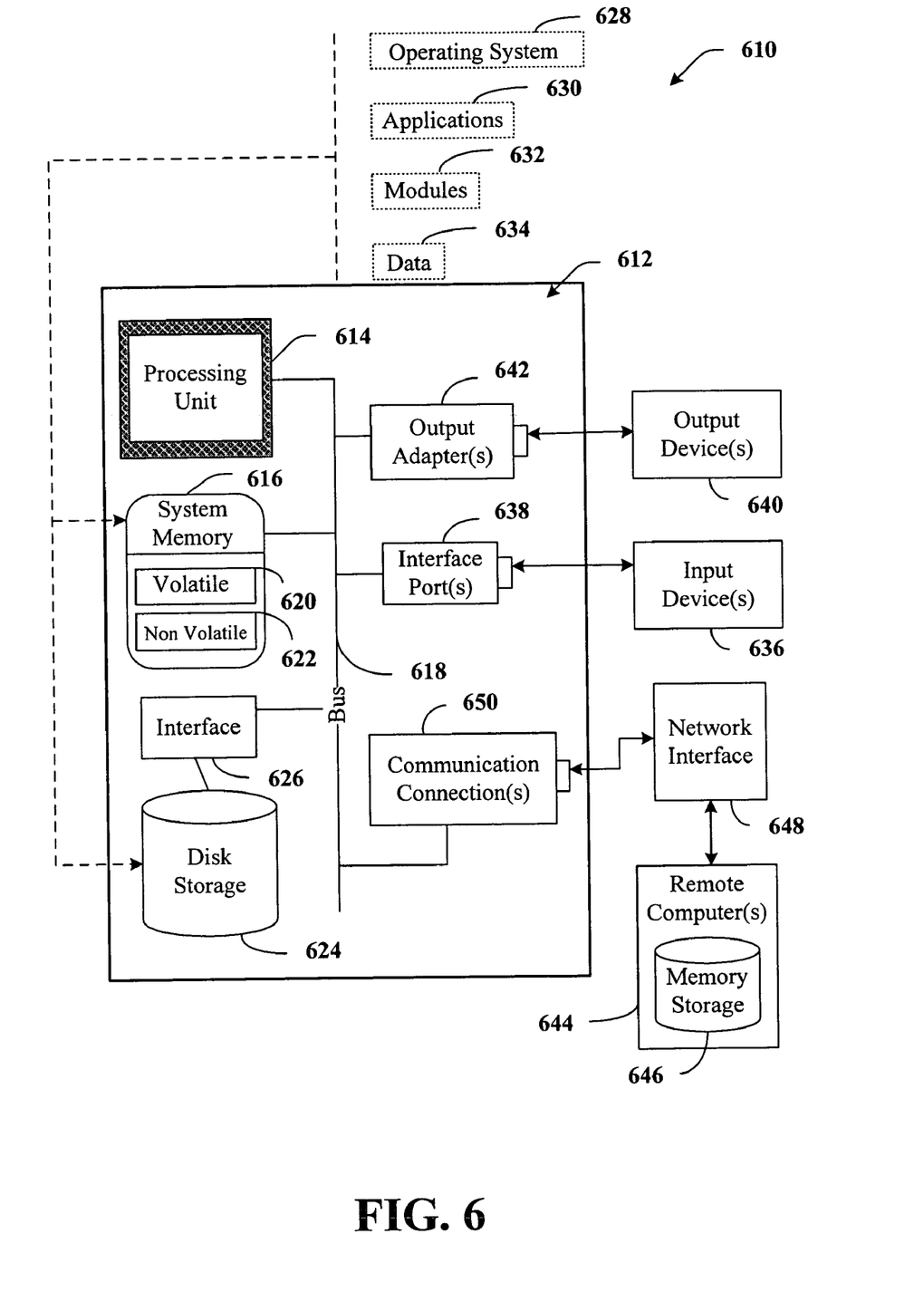
FIG. 6 illustrates an example operating environment in which the invention may function.

In order to provide additional context for various aspects of the subject invention, FIG. 6 and the following discussion are intended to provide a brief, general description of a suitable operating environment 610 in which various aspects of the subject invention may be implemented. While the subject invention is described in the general context of computer-executable instructions, such as program modules, executed by one or more computers or other devices, those skilled in the art will recognize that the subject invention can also be implemented in combination with other program modules and/or as a combination of hardware and software. Generally, however, program modules include routines, programs, objects, components, data structures, etc. that perform particular tasks or implement particular data types. The operating environment 610 is only one example of a suitable operating environment and is not intended to suggest any limitation as to the scope of use or functionality of the subject invention. Other well known computer systems, environments, and/or configurations that may be suitable for use with the subject invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 6, an exemplary environment 610 for implementing various aspects of the subject invention includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/nonremovable, volatile/nonvolatile computer storage media. FIG. 6 illustrates, for example a disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in suitable operating environment 610. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the subject invention can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers among other output devices 640 that require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

Figure 7:
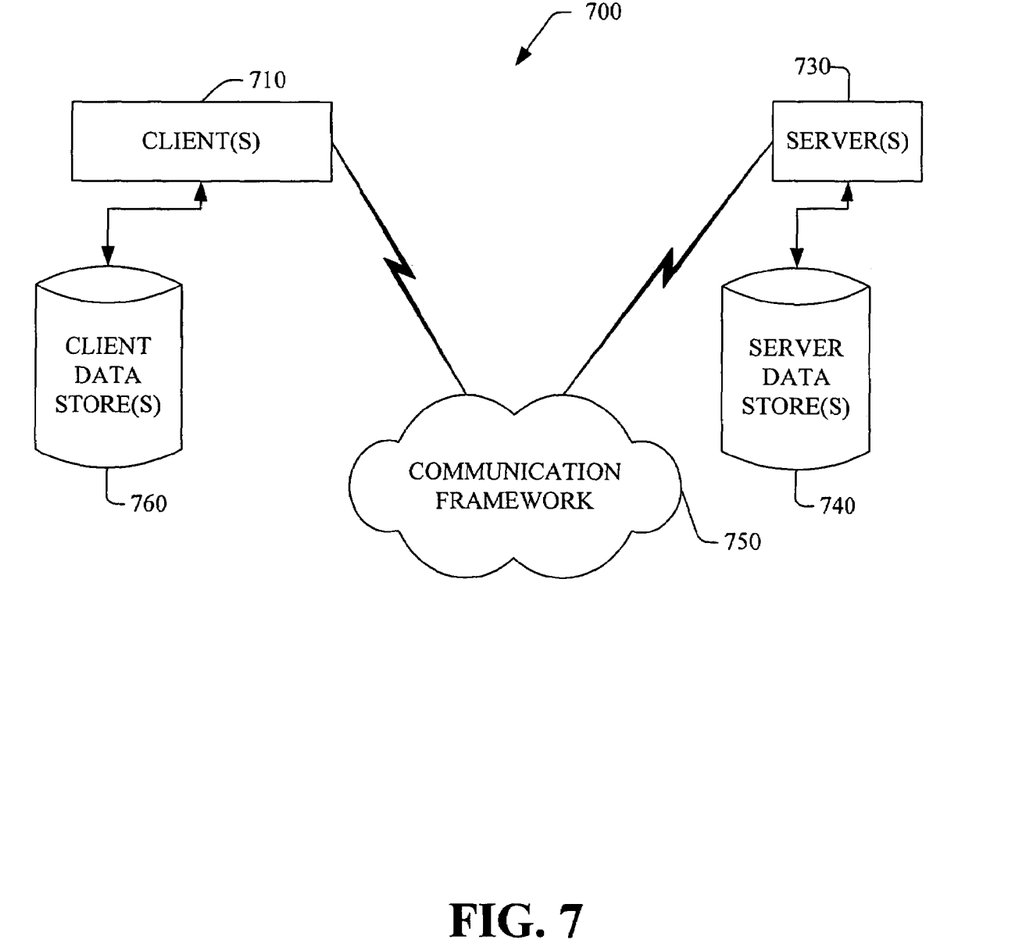
FIG. 7 illustrates an exemplary networking environment that can be employed in connection with the subject invention.

FIG. 7 is a schematic block diagram of a sample-computing environment 700 with which the present invention can interact. The system 700 includes one or more client(s) 710. The client(s) 710 can be hardware and/or software (e.g., threads, processes, computing devices). The system 700 also includes one or more server(s) 730. The server(s) 730 can also be hardware and/or software (e.g., threads, processes, computing devices). The servers 730 can house threads to perform transformations by employing the present invention, for example. One possible communication between a client 710 and a server 730 can be in the form of a data packet adapted to be transmitted between two or more computer processes. The system 700 includes a communication framework 750 that can be employed to facilitate communications between the client(s) 710 and the server(s) 730. The client(s) 710 are operably connected to one or more client data store(s) 760 that can be employed to store information local to the client(s) 710. Similarly, the server(s) 730 are operably connected to one or more server data store(s) 740 that can be employed to store information local to the servers 730.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor executing computer executable instructions to provide:
   a host process residing in user space that hosts and isolates one or more user-mode device drivers stored in a computer readable medium;
   a reflector implemented as a kernel filter driver that operates in kernel memory and is arranged to exchange a message with the one or more user-mode device drivers via the host process, the reflector configured to create at least one of a first device object that enables an application to send a first request to the one or more user-mode device drivers, or a second device object that enables the one or more user-mode device drivers to send a second request to one or more kernel drivers below the reflector; wherein the reflector is at the top of a kernel device stack, such that the reflector intercepts an application I/O (input/output) request and asynchronously forwards the application I/O request to the host process;
   a driver manager residing in user space and arranged to communicate with the host process and the reflector, the driver manager being configured to instantiate the host process based, at least in part, upon a third request from the reflector and remove the host process in response to a fourth request from the reflector; and
   a driver manager control object that operates in kernel memory, the driver manager control object facilitating communication from the driver manager to the reflector by enabling the driver manager control object to send a message to the reflector on behalf of the driver manager.

2. The system of claim 1, wherein the message exchanged between the reflector and the host process comprises an inter process communication (IPC) message.

3. The system of claim 2, wherein the message is associated with a corresponding I/O request from the application, PnP/Power events from an operating system or I/O cancellation events from the application or the operating system.

4. The system of claim 1, wherein the driver manager control object is implemented as a portion of the reflector.

5. The system of claim 1, further comprising a host process control object that operates in kernel memory, the host process control object facilitating communication from the host process to the reflector.

6. The system of claim 1, the reflector comprising an up device object employed to send a message to the user-mode device driver.

7. The system of claim 1, the reflector comprising a down device object employed to receive a message from the user-mode device driver and to forward the message to a kernel driver that performs low-level functionality in kernel memory.

8. The system of claim 1, wherein the driver manager runs as a service of an operating system.

9. The system of claim 1, wherein the driver manager tracks information associated with the host process.

10. The system of claim 1, wherein the one or more user-mode device drivers are instantiated by the host process.

11. The system of claim 1, wherein the reflector receives an IRP message from an operating system and asynchronously provides a plug and play request message to the host process in response to receiving the IRP message.

12. The system of claim 11, wherein the plug and play request message is associated with at least one of a start device message, a query remove device message, a remove device message, a cancel remove device message, a stop device message, a query stop device message, a cancel stop device message, a query device relations message, a query interface message, a query capabilities message, a query resources message, a query resources requirements message, a query device text message, a query filter resource requirements message, a read configuration message, a write configuration message, an eject message, a set lock message, a query ID message, a query PNP device state message, a query bus information message, a device usage notification message, a surprise removal message, a query proximity domain message, a wait wake message, a power sequence message, a set power message, and a query power message.

13. The system of claim 1, wherein the reflector provides a file I/O request message to the host process.

14. The system of claim 13, the file I/O request message comprising at least one of a create message, a cleanup message, a close message, a read message, a write message an I/O control message, and an I/O cancellation message.

15. A method of initializing a user-mode device driver architecture, comprising:
with at least one processor performing the method comprising:
creating a host process in user mode in response to an add device message received from an operating system, the host process being configured to host and isolate one or more user-mode device drivers, wherein the host process is created based, at least in part, upon a request from a reflector implemented as a kernel filter driver in kernel mode;
initializing the host process;
establishing a communication connection between the reflector and the host process, the reflector being at the top of a kernel device stack, such that the reflector intercepts an application I/O (input/output) request and asynchronously forwards the application I/O request to the host process, the reflector being capable of providing multiple communication channels to allow multiple of the one or more user mode device drivers to communicate with a single reflector;
creating a first device object that enables an application to send a first request to the one or more user-mode device drivers;
creating a second device object that enables the one or more user-mode device drivers to send a second request to one or more kernel drivers below the reflector in the kernel device stack; and
building a user-mode device stack associated with the one or more user-mode device drivers.

16. The method of claim 15, further comprising at least one of the following:
detecting that a device has been added to a system;
notifying the reflector of the process ID of the host process; and,
receiving a start message from the operating system.

17. A computer readable medium having stored thereon computer executable instructions for carrying out the method of claim 15.

18. A system that facilitates isolation of one or more user-mode device drivers, the system comprising:
at least one processor executing:
means for exchanging a message with the one or more user-mode device drivers via a host process operating in user mode, the means operating in kernel memory and creating a device object that enables the one or more user-mode device drivers to send a first request to one or more kernel drivers residing below the means in a kernel device stack;
wherein the means is located at the top of the kernel device stack, in a manner that enables the means to intercept an application I/O (input/output) request and asynchronously forward the application I/O request to the host process;
wherein the means is configured to forward the first recluest received from the one or more user-mode device drivers to the one or more kernel drivers residing below the means in the kernel device stack.

* * * * *